United States Patent [19]

De Bie

[11] Patent Number: 5,120,387
[45] Date of Patent: Jun. 9, 1992

[54] METHOD OF MANUFACTURING A FIBER BUNDLE COMPOSED OF OPTICAL FIBERS

[75] Inventor: Johannes H. De Bie, Eindhoven, Netherlands

[73] Assignee: U.S. Philips Corp., New York, N.Y.

[21] Appl. No.: 467,708

[22] Filed: Jan. 18, 1990

[30] Foreign Application Priority Data

Sep. 14, 1989 [NL] Netherlands ............... 8902294

[51] Int. Cl.⁵ ............... G02B 6/06; G02B 6/08; B32B 31/18
[52] U.S. Cl. ............... 156/250; 156/296; 385/121; 385/116
[58] Field of Search ............... 350/96.24, 96.25, 96.27; 156/296, 175, 173, 169, 436, 166, 250, 174, 325

[56] References Cited

U.S. PATENT DOCUMENTS

| | | | |
|---|---|---|---|
| 3,523,844 | 8/1970 | Crimmins et al. | 156/436 X |
| 3,607,560 | 9/1971 | Peck | 156/175 X |
| 3,674,914 | 7/1972 | Burr | 156/166 X |
| 3,741,839 | 6/1973 | Komiya | 350/96.25 X |
| 3,819,442 | 6/1974 | Brushenko | 350/96.24 X |
| 4,090,902 | 5/1978 | Ferrentino et al. | 156/179 X |
| 4,570,063 | 2/1986 | De Bie et al. | 350/96.25 X |
| 4,720,165 | 1/1988 | Tokuda et al. | 350/96.24 |
| 4,852,982 | 8/1989 | Yamamoto et al. | 350/96.25 X |

FOREIGN PATENT DOCUMENTS

| | | |
|---|---|---|
| 0330590 | 2/1989 | European Pat. Off. |
| 58-132705 | 8/1983 | Japan . |
| 59-50408 | 3/1984 | Japan . |
| 60-73504 | 4/1985 | Japan . |
| 63-151907 | 6/1988 | Japan . |

*Primary Examiner*—Michael W. Ball
*Assistant Examiner*—Jeff H. Aftergut
*Attorney, Agent, or Firm*—Ernestine C. Bartlett

[57] ABSTRACT

An optical fiber bundle for use in a device for scanning documents comprises optical fibers (10) which are substantially arranged along a line at the document side and which fill a plane at the side of an optical detector. To manufacture this bundle, the fibers (10) are first juxtaposed, subsequently slid together to the desired cross-section by means of one or two sliding members (21, 22) at the area where the second end is to be formed, after which the fibers are fixed and severed. The two end faces are subsequently provided with elements (52, 71) for coupling in and complying out radiation. These elements are preferably secured by means of an adhesive having a refractive index that is substantially the same as the refractive index of the core material of the fibers.

13 Claims, 2 Drawing Sheets

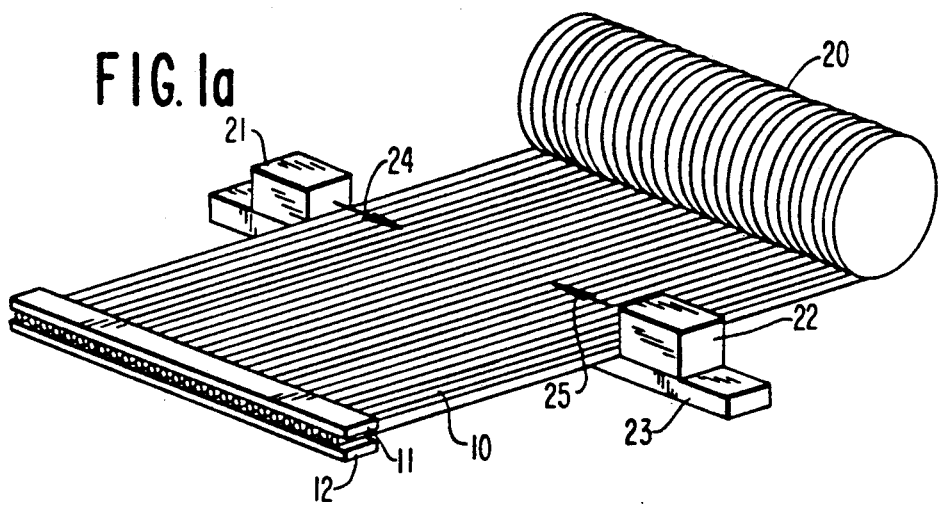
FIG. 1a
FIG. 1b
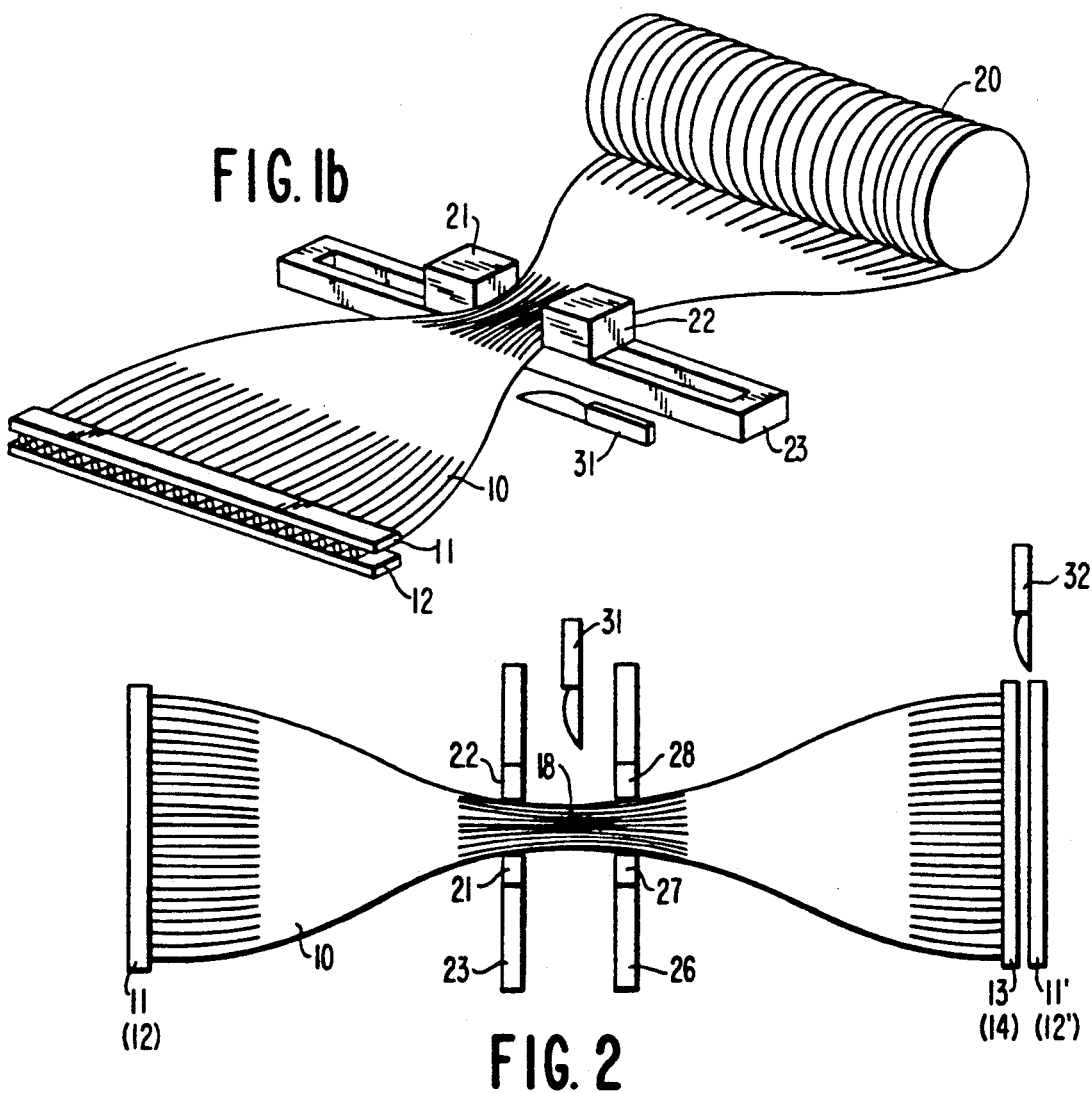
FIG. 2

METHOD OF MANUFACTURING A FIBER BUNDLE COMPOSED OF OPTICAL FIBERS

FIELD OF THE INVENTION

The invention relates to a method of manufacturing a fiber bundle composed of optical fibers which have a core and a cladding, said bundle having a first and a second end face, the fibers being first arranged in substantially juxtaposed position and subsequently arranged, at the area where the second end face is to be formed, as a bundle having a cross-section which corresponds to a desired shape of the second end face, said fibers being finally brought to the desired length.

BACKGROUND OF THE INVENTION

Such a fiber bundle is used, for example, in a device for scanning a document. The document is introduced under the first end face of the fiber bundle and an image of the part of the document lying under this end face is transmitted via the fiber bundle to a detection system arranged at the second end face. Due to a linear first end face of the fiber bundle this end is optimized for scanning the document over its full width, while the shape of the second end face is optimized for the detection system due to the different arrangement of the fibers. As a result a detection system, which is inexpensive because it is mass-produced, can be used, such as a CCD sensor element for a video camera. A device for scanning documents in which such a fiber bundle is present is described for example in U.S. Pat. No. 4,570,063.

The fibers used may be so-called "step-index" or "graded-index" fibers and may be manufactured from any suitable material, for example, glass, quartz or a synthetic material such as polymethyl methacrylate.

A method as described in the opening paragraph is known from "Patent Abstracts of Japan", Vol. 7, no. 249 (p. 234) [1394], Kokai no. JP-A 58-132705 in which an optical fiber is wound on a drum, while the adjacent turns are connected to each other by means of an adhesive and subsequently cut loose from the drum so that a sheet composed of optical fibers is produced. Subsequently one end of each fiber is loosened from the sheet and placed in an opening of a rectangular grid, while the fibers are again fixed with respect to each other by means of an adhesive and the rectangular end face thus formed is flattened and polished.

This known method is cumbersome and therefore expensive. After the sheet formed from optical fibers has been detached from the drum, each fiber must be separately introduced into the grid. Since such a fiber bundle has a very large number of fibers, this operation is time-consuming, the standard number for, for example a facsimile apparatus (group 3 in accordance with the CCITT standards i.e. the standards of the Comité Consultative Internationale de Telegraphic et Telephonie) is 1728. Moreover, this process is not continuous. After the fiber has been wound on the drum, the drum must be stopped to remove the manufactured sheet. Furthermore, each fiber in the fiber bundle is cut off twice, namely after the fiber has been wound on the drum and subsequently after the fibers have been placed in the grid. The fibers in the sheet formed have equal lengths while the fibers in a fiber bundle formed in this way have unequal lengths. This may cause problems when providing the fibers in the bundle without any tension and, in view of the large number of fibers, results in a quite considerable loss of material.

SUMMARY FO THE INVENTION

One of the objects of the invention is to provide a method of manufacturing a fiber bundle in which the drawbacks of the method known from JP-A 58-132705 do not occur. To this end the invention comprises a the method wherein the desired cross-section at the area of the second end face to be formed is obtained by sliding the fibers together by means of at least one sliding member.

In the fiber bundle is the method of the invention first brought to the desired shape and the fibers are jointly (and not individually) given their correct position in the second end face to be formed. The method may use a single sliding member so that a fiber bundle is produced in which the second end face is arranged asymmetrically with respect to the first end face or bundle, two sliding members may be used which face each other and are slid towards each other on both sides of the bundle to produce a symmetrical fiber bundle.

According to one embodiment of the invention, the fibers are fed from storage means in a planar array, the fibers are, then slid together in the desired cross-section at the area of the second end face to be formed and are fixed in this array and finally the fixed fibers are cut loose from the remaining fibers in the storage means. By cutting loose the fibers in the fiber bundle after it has been formed from the fibers in the storage means, loss of material is prevented and, moreover, each fiber need only be cut once.

Preferably, at least two sliding members are used which are juxtaposed in the longitudinal direction of the fibers on both sides of the second end face to be formed. In this way two fiber bundles are manufactured and severed simultaneously. As a result the process steps can be carried out substantially continuously and undisturbed.

In an embodiment of the method according to the invention the fibers are slid together in packets having the desired cross-section. In this embodiment, fibers which are juxtaposed in the sheet, i.e. packet, are also juxtaposed in the second end face. It is thereby determined in advance which position a fiber acquires in the second end face. It is then not necessary to perform a measurement after the fiber bundle has been manufactured to determine the association of the fiber ends in both end faces. According to the invention the sliding together in packets is accomplished by placing the fibers on a special comb before sliding them together.

Alternatively the fibers may be arranged in an orderly manner in the second end face to be formed by a, method wherein prior to sliding the sliding members towards each other, the fibers are embraced by a plurality of finger pairs, each finger pair embracing a plurality of fibers, whereafter the finger pairs are rotated about a shaft which is aligned substantially parallel to the fibers.

The finger pairs may consist of, for example, a base on which two parallel fingers are placed. The fibers can be drawn between the fingers, or, after the fibers have been clamped, the fingers may be provided on both sides of the fiber sheet which is still lying loose, for example, by inserting one of the fingers between two fibers through the fiber sheet.

In a third alternative of forming packets of fibers which are slid together, a plurality of pins substantially perpendicular to the plane of the fibers is arranged in a pattern of a fiber sheet or pocket to be formed and the fibers are pulled between the pins so that the fibers are arranged in a plurality of well-ordered packets.

The method according to the invention may be further characterized in that, after the fibers have been brought to the desired length, the second end face is provided with an optical system for coupling in light in said end face. Light which is efficiently transmitted to the fiber bundle for illuminating the relevant part of the document to be scanned is obtained by means of such an optical system. The second end face may also be provided with an optical system for imaging the second end face in an image plane at some distance from the second end face. Such an imaging optical system which is fixedly connected to the fiber bundle contributes to an image of the second end face on the detection system which involves little loss of light, and to an optimum adaptation between the surface of the detection system and the second end face.

A material is preferably used for this purpose having a refractive index that substantially corresponds to the refractive index of the core material of the fibers. Reflections on the fiber ends are then prevented and unevennesses are filled up so that it is not necessary to polish the fibers accurately to equal lengths.

The fiber ends at the first end face may be chamfered and subsequently the said end face may be provided with a transparent plate. By providing the fibers with a chamfered end and a transparent plate or foil, the light reflected on the fiber end is only partly reflected back and only a part of the light which is reflected back falls within the numerical aperture of the fiber so that only a part can propagate in the fiber and reach the detection system. Moreover, the transparent plate is a protection for the fiber ends.

The transparent plate may be secured to the first end face by means of a transparent adhesive which, after curing, has a refractive index which is substantially equal to the refractive index of the core material of the optical fibers. By using such an adhesive, it is possible to dispense with the step of polishing of the fiber ends to equal lengths. Fresnel reflection on the fiber ends is also prevented.

BRIEF DESCRIPTION OF THE DRAWINGS

These and other aspects of the method according to the invention will be described in greater detail with reference to the accompanying drawings.

The drawings illustrate some embodiments of the method according to the invention, in which FIGS. 1a and 1b illustrate the operation of the sliding members;

FIG. 2 shows a method in which two fiber bundles can be manufactured simultaneously;

DETAILED DESCRIPTION OF PREFERRED EMBODIMENTS

Figure 3:
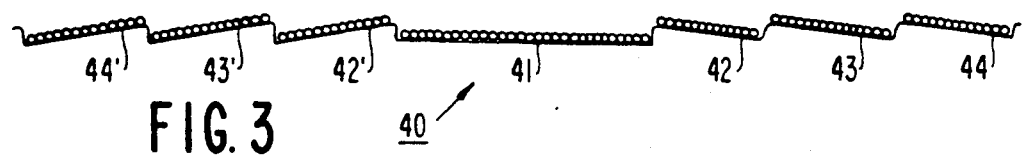
FIG. 3 shows a special comb for sliding the fibers together in packets.

FIG. 1a shows a sheet 10 composed of optical fibers. The sheet 10 is constituted by a large number of fibers juxtaposed in one sheet or in several sheets. These fibers form part of long fibers which are present in a storage means, for example, a plurality of reels. The fibers may be wound individually on reels or they may be combined in flat ribbons each comprising, for example 10 or 12 fibers or a multiple thereof.

Proximate to their ends the fibers are clamped between two holders 11 and 12 and they are pulled between two sliding members 21 and 22 over a distance which corresponds approximately to the length of the fiber bundle to be formed. The distance between the sliding members is at least equal to the width of the fiber bundle. The sliding members engage a support 23 on which they can be moved towards each other by means of a drive unit (not shown) in the direction of the arrows 24 and 25.

By moving the sliding members towards each other, the fibers are slid together at the area of the sliding members to a bundle having a rectangular cross-section, as is shown in FIG. 1b. The extra fiber length required for this purpose, especially of the fibers at the edge, is obtained by further dereeling the fibers from the storage means.

After the fiber bundle has been given the desired cross-section by means of the sliding members 21 and 22, the fiber is fixed in the bundle, for example, by injecting an adhesive and by causing it to cure. Finally, the fiber bundle is cut to the desired length at a position which is shown diagrammatically by means of a knife 31. Another method of loosening the fibers, for example, by sawing or grinding may also be performed. It is to be noted that the fibers need only be fixed at their ends and, if desired, the portion between the ends of each fiber may be clear of a support, without any fixation.

The fiber bundle which has been fixed and cut is subsequently further processed. The ends of the fibers in the storage means from which the bundle has been cut loose are subsequently clamped between holders 11 and 12 so that the next flared fiber bundle can be made in the afore-described manner from the fibers accommodated in the storage means 20. If the device with which the method is performed is suitably designed, the method according to the invention will lend itself satisfactorily for performing the method of manufacturing fiber bundles continuously in a cycle.

In addition to a rectangular cross-section, the fiber bundle at the area of the second end face may alternatively have a different cross-section, for example a circular section by adapting the shape of the sliding members. By arresting one of the sliding members and moving only the other one, a fiber bundle can be obtained whose second end face is arranged asymmetrically with respect to its first end face.

Additionally, a fiber bundle can be made whose second end face is rotated with respect to its first end face. This bundle is obtained by rotating the support 23 of the sliding members with respect to the holders 11 and 12 before the fibers are fixed in the bundle and are cut off.

FIG. 2 shows a method with which two fiber bundles can be obtained simultaneously. A sheet of fibers is pulled between two pairs of sliding members 21, 22 and 27, 28 by means of two holders 11 and 12. The pairs of sliding members are placed side by side in the longitudinal direction of the fibers so that, after the fibers have been slid together, a part 18 of the fiber bundle has a uniform cross-section. At the side of the storage means the fibers are held in position side by side between two pairs of holders 13, 14 and 11', 12'. The sliding members 21, 22 and 27, 28 are subsequently slid towards each other on the respective supports 23 and 26 and the fibers are fixed with respect to each other, for example, by means of an adhesive and they are cut or ground at the positions which are shown diagrammatically by means of knives 31 and 32. In this way two fiber bundles are manufactured simultaneously. After the manufactured fiber bundles have been removed, parts of the fiber are again dereeled from the storage means by means of the holders 11' and 12' and pulled between the sliding members which have now moved apart again. The holders 11' and 12' then have the same role as the holders 11 and 12 in the foregoing cycle. The sliding members 21 and 27 and the sliding members 22 and 28 may be arranged on the same support and driven by the same mechanism.

While the fibers are being slid together, they will be distributed approximately arbitrarily in the fiber bundle formed, if no further measures are taken. This means that it will be unknown where the second end of a fiber, whose first end has a certain position in the first end face, is present. After manufacture of the fiber bundle a measuring step is thus required to determine the association between the fiber ends. This measuring step may be dispensed with if the sliding operation is performed in a manner in which the fibers are controllably slid together in the form of packets.

FIG. 3 shows a comb 40 on which the fibers rest before they are slid together. In the device such a comb is present beside the sliding members, preferably on both sides thereof. The comb 40 has a central portion 41 whose width is equal to the width of the second end face of the bundle to be formed. On both sides of the central portion there are plateaus 42, 42'; 43, 43'; 44, 44' etc. having a width which is half the width of the central portion. A difference in height which is approximately equal to the diameter of the fibers is present between the plateaus 42 and 42' and the central portion 41, and between the plateaus themselves. When the sliding members move towards each other along the comb, the fibers which are positioned at different plateaus slide over each other so that the mutual position of juxtaposed fibers is maintained. Fibers on juxtaposed plateaus are slid over each other. In this way it is predetermined where a fiber takes up its position in the second end face.

The same effect can be obtained by giving the sliding members a suitable shape or by composing them from a plurality of submembers so that the fibers are also slid over each other in packets. Sliding in packets is readily accomplished when the fibers have already been combined in flat ribbons. For example, 1728 fibers can be combined to a bundle with a rectangular cross-section comprising 36 sheets each of which has 4 juxtaposed ribbons comprising 12 juxtaposed fibers. Alternatively, 36 sheets of one ribbon with 48 fibers each can be used. The combination of fibers in the form of ribbons is known per se. A method is described, for example in U.S. Pat. No. 4,720,165.

Figure 4A:
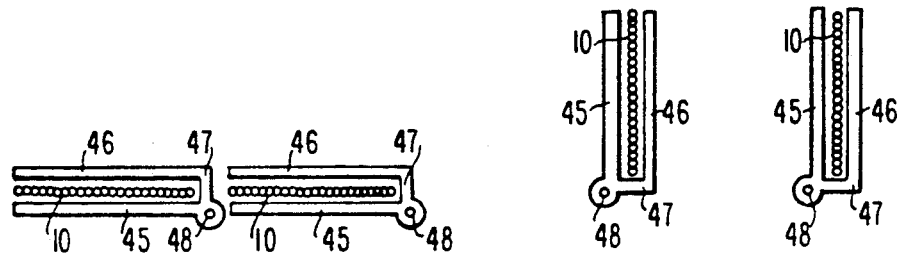
FIGS. 4a and 4b show the use of finger pairs and pins for combining the fibers in packets.

FIG. 4a shows four finger pairs. The two parallel fingers 45 and 46 of each pair are secured to a base 47. Together with the fingers 45 and 46, the base 47 is rotatable about a shaft 48 whose direction is approximately parallel to that of the fibers in the sheet 10 which has not been fixed yet. When the fibers have been introduced in between the two fingers 45 and 46, the finger pair rotates about the shaft so that a packet of ordered fibers is produced. The various packets of fibers are subsequently slid together by means of two sliding members 21 and 23, as is shown in FIG. 4b.

Figure 4B:
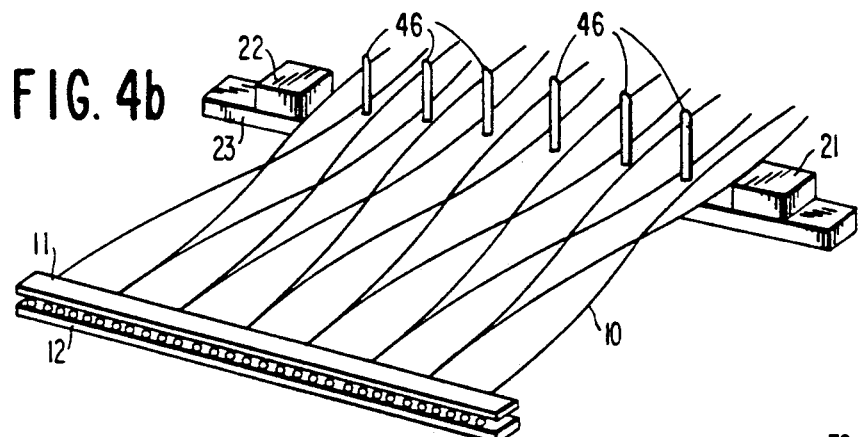

The configuration of a plurality of fiber packets shown in FIG. 4b within which packets the fibers are arranged above each other may alternatively be obtained by pulling the fibers between a plurality of pins. These pins are not rotatable, but they are stable and have approximately the same dimensions and fulfill the same role as the fingers 45 and 46.

After the fiber bundles have been manufactured, they are to be provided with optical elements for coupling in and coupling out light. To this end a flat plate can be provided on the first end face. Preferably, this plate is made of a wear-resistant material, for example, glass. The plate is provided by means of an adhesive which, after curing, has approximately the same refractive index as the core material of the fibers. In that case there is no reflection on the interface between adhesive and fiber core so that the fiber ends need not be given exactly equal lengths and need not be plane-polished because the unevennesses are filled up by the adhesive. Preferably a material curing under the influence of UV light or heat is used as an adhesive. For fibers with a "graded-index" core the refractive index of the adhesive should be approximately within the range of the refractive indices of the core material.

Figures 5A, 5B:
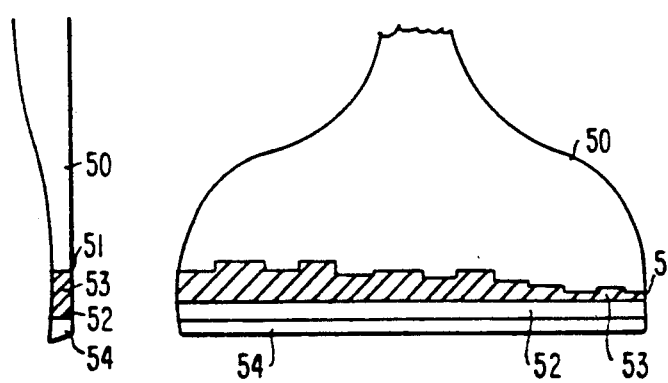
FIGS. 5a and 5b show illustrate a transparent plate provided on the first end face of the fiber bundle.

FIGS. 5a and 5b show the first end face 51 of the fiber bundle 50, provided with a flat transparent plate 52. The intermediate space is filled up with a resin 53. The plate 52 may be made of a material having a refractive index which is substantially equal to that of the resin 53 and the core material of the fibers so that there are substantially no Fresnel reflections on the interface. The plate 52 may be alternatively manufactured from a material having a lower refractive index so that the sum of the reflections on both faces of the plate is reduced. The plate 52 is preferably provided with a wear-resistant anti-reflective coating 54 so that reflections on the front side are minimal.

The ends of the fibers are preferably chamfered and the plate 52 is provided at an angle with respect to the axis of the optical fibers. As a result only a part of the light reflected on the front or rear side of the plate 52 is reflected back into the core of the fibers. Of this part only a portion is incident at an angle at which it can propagate in the fibers. The rest falls outside the numerical aperture and leaves the fibers via the cladding after a short distance. The angle is approximately 20° in fibers comprising polymethyl methacrylate as a core material having a refractive index of approximately 1.495 and cladding material having a refractive index of approximately 1.41.

For coupling in light so as to illuminate the document and for coupling out the light reflected by a document, an optical system is connected to the second end face of the fiber, preferably also by means of a resin curing under the influence of UV light or heat and having a refractive index which is approximately equal to the refractive index of the core material of the fibers. Consequently, the fiber ends need not be polished.

Figure 6:
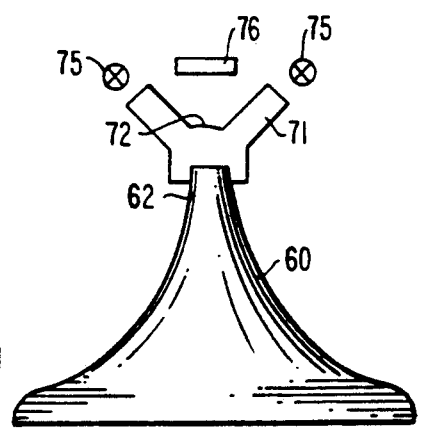
FIG. 6 shows a fiber bundle with an optical system for coupling in light and for imaging the second end face on the detection system.

As is shown in FIG. 6, such an optical system comprises, for example, a cone-shaped portion 71 for guiding light from light sources 75 to the entrance face 62 of the fiber bundle 60. Furthermore the optical system has a refractive face 72 with which the second end face of the fiber bundle can be imaged on a detection system 76. By a suitable choice of the dimensions of the cone-shaped portion 71 and the material from which the optical system is made, particularly the refractive index, radiation from the light sources 75 can be prevented from reaching the detection system 76 via reflection on the second end face or the layer provided thereon.

A fiber bundle manufactured in accordance with the invention may not only be used for simultaneous illumination and detection but also for only one of these operations. Other fields of use are also feasible.

I claim:

1. A method of manufacturing a fiber bundle composed of optical fibers which have a longitudinal axis, a core and a cladding, said bundle having a first and a second end face, wherein the fibers are fed from storage means in a substantially juxtaposed position and subsequently arranged, at the area where the second end face is to be formed, to a bundle having a cross-section which corresponds to a desired shape of the second end face, the desired cross-section at the area where the second end face is to be formed being obtained by sliding the fibers together by means of at least one sliding member which is positioned on at least one side of the area where the second end face is to be formed and which moves in a direction that is perpendicular to the longitudinal axis of the fibers, said fibers then being severed from said storage means to form the second end face of the fiber bundle.

2. A method as claimed in claim 1, wherein the fibers are fed from storage means in a planar array, the desired cross-section is subsequently formed at the area where the second end face is to be formed, and the fibers are fixed in this array and severed from the remaining fibers in the storage means.

3. A method as claimed in claim 1, wherein at least two sliding members are used which are juxtaposed in the longitudinal direction of the fibers on both sides of the area where the second end face is to be formed.

4. A method as claimed in claim 1, wherein the fibers are slid together in packets having the desired cross-section.

5. A method as claimed in claim 4, wherein, prior to sliding the sliding members towards each other, the fibers are embraced by a plurality of finger pairs, each finger pair embracing a plurality of fibers, after which the finger pairs are rotated about a shaft which is aligned substantially parallel to the fibers.

6. A method as claimed in claim 4, wherein a plurality of pins substantially perpendicular to the plane of the fibers is arranged in a fiber sheet and the fibers are pulled between the pins so that the fibers are arranged in a plurality of ordered packets.

7. A method as claimed in claim 1, wherein, after the fibers have been severed, the second end face is provided with an optical system for coupling in light in said end face.

8. A method as claimed in claim 1, wherein the second end face is provided with an optical system for imaging the second end face in an image plane at some distance from the second end face.

9. A method as claimed in claim 7 or 8, wherein the respective optical system is provided on the second end face by means of a material having a refractive index which substantially corresponds to the refractive index of the core material of the optical fibers.

10. A method as claimed in claim 1, wherein the fiber ends at the first end face are chamfered, and the first end face is subsequently provided with a transparent plate.

11. A method as claimed in claim 1, or wherein a transparent plate is secured to the first end face by means of a transparent adhesive which, after curing, has a refractive index which is substantially equal to the refractive index of the core material of the optical fibers.

12. A method as claimed in claim 3 wherein two fiber bundles are manufactured and severed simultaneously.

13. A method as claimed in claim 1 carried out continuously.

* * * * *